Jos Steger
Hose-Coupling.

№ 74,950. Patented Feb. 25, 1868.

Witnesses.
W. H. Smith
Peter Barry

Inventor:
Jos. Steger
per
Wm. Saulwood & Krauff
Atty

United States Patent Office.

JOSEPH STEGER, OF NEW YORK, N. Y.

Letters Patent No. 74,950, dated February 25, 1868; antedated February 14, 1868.

IMPROVEMENT IN HOSE-COUPLING.

*The Schedule referred to in these Letters Patent and making part of the same.*

TO ALL WHOM IT MAY CONCERN:

Be it known that I, JOSEPH STEGER, of No. 24 Suffolk street, New York, in the county and State of New York, have invented a new and useful Improved Hose-Coupling; and I do hereby declare that the following is a full, clear, and exact description thereof, which will enable those skilled in the art to make and use the same, reference being had to the accompanying drawing, forming part of this specification, in which drawing—

Similar letters of reference indicate corresponding parts.

This invention relates to a hose-coupling in which each of the half-couplings is provided with two or more teeth with inclined faces, in combination with a set-screw, which is tapped into the side of the female half-coupling in such a manner that by inserting the male half-coupling into the female half-coupling, a slight turn given to the half-couplings, or one of them, in the proper direction, will cause the teeth to interlock, and, by screwing up the set-screw, the inclined faces of said teeth are made to slide over each other, and the end of the male half-coupling is pressed up tight against a suitable packing introduced into the female half-coupling, and a coupling is obtained which can be coupled and uncoupled with ease and rapidity, and which, when coupled, forms a tight joint.

Figure 1:
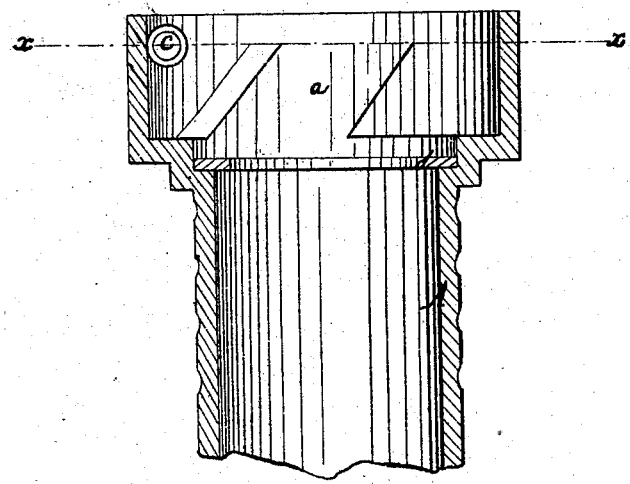
Figure 1 represents a longitudinal central section of the female half-coupling.
Figure 2:
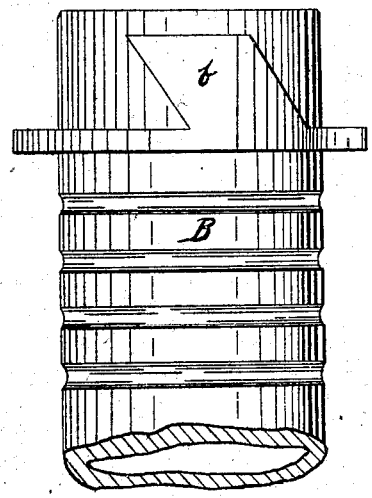
Figure 2 is a side elevation of the male half-coupling.

A represents the female half of my coupling, and B the male half, said half-couplings being cast or otherwise produced of brass, iron, or any other suitable material. Each of the half-couplings is provided with two or more teeth $a\,a$, $b\,b$, the faces of which form inclined planes, and which are so situated that the teeth $b$ of the male half-coupling can be made to pass in between the teeth $a$ of the female half-coupling, and that, by slightly turning the male half-coupling in the direction of the arrow marked on it in fig. 3, the inclined faces of the teeth $b$ interlock with those of the teeth $a$. Through the side of the female half-coupling A passes a set-screw, $c$, in such a position that when the two half-couplings are put together, the point of said screw can be made to bear on the back of one of the teeth $b$, and by screwing up said screw, the inclined faces of the teeth $b$ are caused to slide over the inclined faces of the teeth $a$, and thereby the end of the male half-coupling B is pressed up firmly against a packing-ring, $d$, inserted into the female half-coupling A, as shown in fig. 1 of the drawing.

Figure 3:
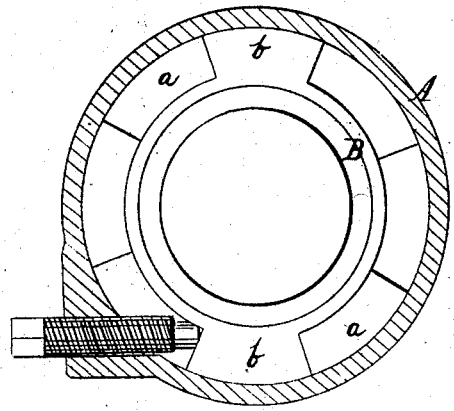
Figure 3 is a transverse section of the coupling when put together, the line $x\,x$, fig. 1, indicating the plane of section.

By these means a tight joint is produced between the half-coupling, and furthermore the two half-couplings are firmly united, and they have no chance to disconnect themselves until the screw $c$ is turned back far enough to allow of disengaging the teeth $b$ from the teeth $a$, which will be effected by turning the half-coupling B in the direction opposite the arrow marked on it in fig. 3.

A coupling made according to this invention is very cheap, it is durable, and not liable to get out of repair, and it can be coupled and uncoupled very expeditiously, and without being obliged to turn either of the half-couplings round and round. The teeth $a\,b$ of my two half-couplings will interlock quite readily, and by screwing up the set-screw $c$, the two half-couplings are firmly united, and a tight joint is formed between them. It remains to remark that the screw could be replaced by an eccentric-lever, or other device of a similar nature, which I would consider equivalents of the set-screw.

What I claim as new, and desire to secure by Letters Patent, is—

The teeth $a\,a$, $b\,b$, and set-screw $c$, or its equivalent, in combination with the two half-couplings A B, constructed and operating substantially as and for the purpose set forth.

JOSEPH STEGER.

Witnesses:
W. HAUFF,
J. C. POLLER.